United States Patent [19]

Pedersen et al.

[11] Patent Number: 5,462,719
[45] Date of Patent: Oct. 31, 1995

[54] METHOD AND APPARATUS FOR MIXING AND DISTRIBUTING FLUIDS IN A REACTOR

[75] Inventors: Michael J. Pedersen, Irvine; Vijay R. Sampath, Brea; James F. Litchfield, South Pasadena, all of Calif.

[73] Assignee: Atlantic Richfield Company, Los Angeles, Calif.

[21] Appl. No.: 255,583

[22] Filed: Jun. 8, 1994

[51] Int. Cl.⁶ ........................................ B01F 5/06
[52] U.S. Cl. .................. 422/195; 422/194; 422/220; 422/224
[58] Field of Search .................... 422/194, 195, 422/220, 224, 225, 228; 366/337, 340, 341

[56] References Cited

U.S. PATENT DOCUMENTS

| | | | |
|---|---|---|---|
| 3,480,407 | 11/1969 | Wentworth et al. | 422/194 X |
| 3,524,731 | 8/1970 | Effron et al. | 422/195 X |
| 3,556,736 | 1/1971 | Boyd | 422/194 X |
| 3,592,612 | 7/1971 | Ballard et al. | 422/195 X |
| 3,598,541 | 8/1971 | Hennemuth et al. | 422/194 X |
| 3,787,189 | 1/1974 | Muffat et al. | 422/195 X |
| 4,138,327 | 2/1979 | Scott | 208/146 |
| 4,275,021 | 6/1981 | Kirkpatrick et al. | 261/114 |
| 4,295,936 | 10/1981 | Farnham | 202/153 |
| 4,601,788 | 7/1986 | Bannon | 202/153 |
| 4,629,534 | 12/1986 | Ezell | 203/98 |
| 4,714,542 | 12/1987 | Lockett | 208/347 |
| 5,091,119 | 2/1992 | Biddulph | 261/114.3 |
| 5,152,967 | 10/1992 | Rossetti et al. | 422/195 X |
| 5,230,839 | 7/1993 | Sampath et al. | 261/110 |
| 5,232,283 | 8/1993 | Goebel et al. | 422/225 X |

*Primary Examiner*—Robert J. Warden
*Assistant Examiner*—Robert Carpenter
*Attorney, Agent, or Firm*—Tom F. Pruitt

[57] ABSTRACT

A method and apparatus for mixing and distributing two reactants within a column. The apparatus forms a mixing zone in the column into which a first reactant (e.g. a process stream having both gas and liquid phases) flows vertically downward. The second reactant (e.g. quench gas) is introduced into the mixing zone and flows radially to intercept the downflowing process stream. Due to the construction of the mixing zone, a torturous path is provided which thoroughly mixes the different gas phases and the liquid phase by several different mechanisms, i.e. (a) radial jet mixing; (b) perpendicular mixing of the liquid and gas phases; (c) jet/turbulent mixing; (d) high velocity swirl jet mixing and atomizing of the liquid phase; (e) turbulent swirl mixing after the liquid is atomized; (f) additional turbulent jet mixing; and (g) energy dissipation of the flow as the mixed stream is distributed radially outward across the column through first a sieve tray and then a riser tray.

14 Claims, 3 Drawing Sheets

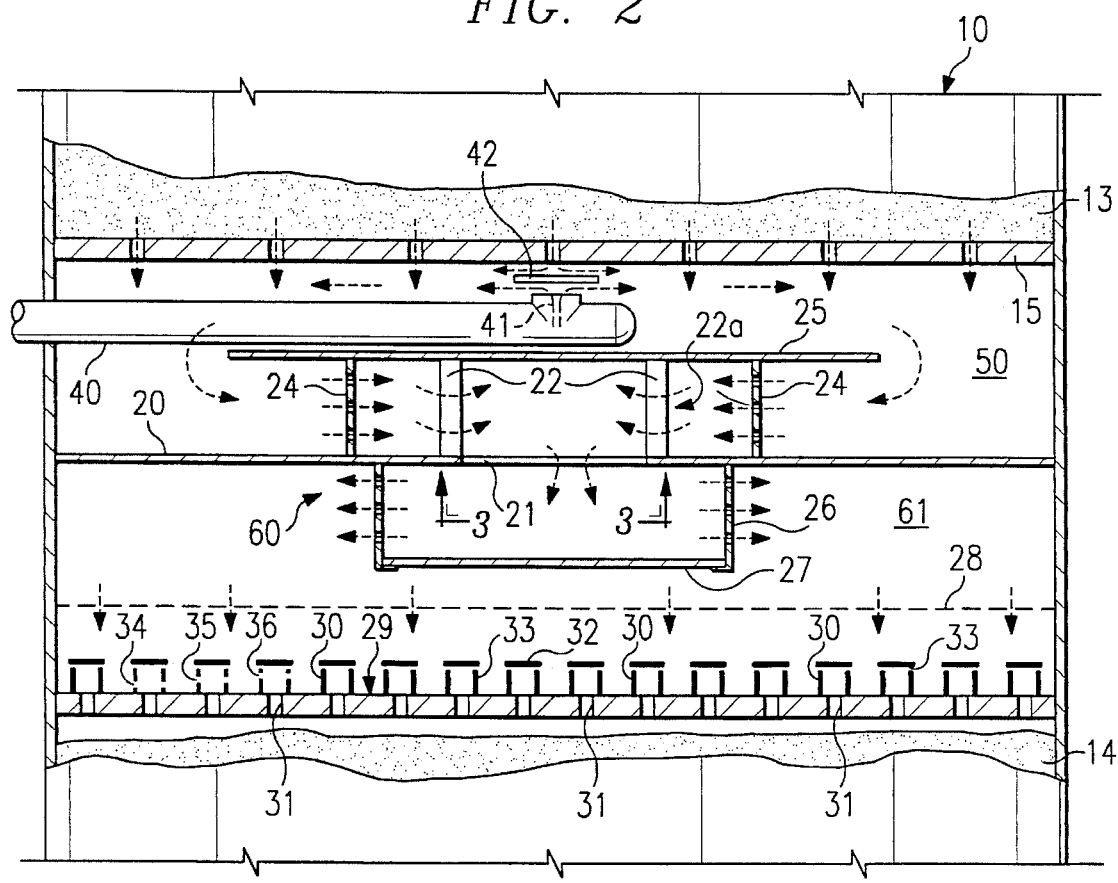

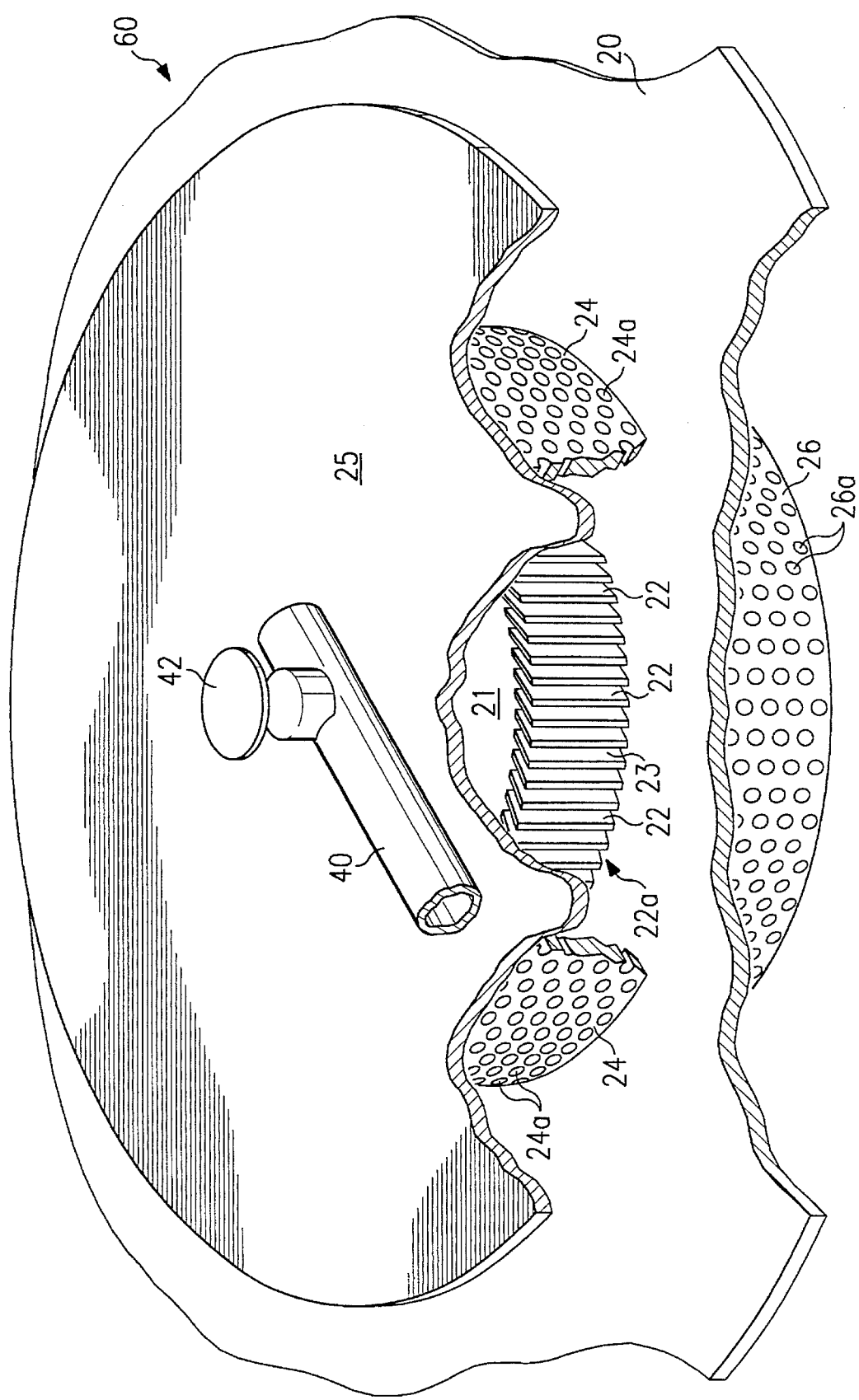

METHOD AND APPARATUS FOR MIXING AND DISTRIBUTING FLUIDS IN A REACTOR

DESCRIPTION

1. Technical Field

The present invention relates to a method and apparatus for mixing and distributing fluids in a reactor and in one of its aspects relates to a reactor column having at least one mixing zone which includes apparatus for (a) mixing a first reactant stream (e.g. liquid and vapor phases of a feed stream) with a second reactant such as a quench gas (e.g. hydrogen) and then (b) uniformly distributing the mixed reactants radially across the column.

2. Background Art

There are several well known processes wherein the phases (vapor/liquid) of a mixed-phase, first reactant stream are flowed cocurrently downward through a reactor column (e.g. one or more fixed-beds of catalyst) to generate a reaction which, in turn, produces a desired product(s). Such processes are widely used in the refining of petroleum and to a lesser extent in the manufacturing of various chemical products. These processes utilize exothermic reactions which, in turn, generally require a second reactant (e.g. a gas such as hydrogen). Among such processes are those commonly known as: hydrocracking, hydrogenation, desulfurization, denitrogenation, hydrotreating, combinations thereof, and others.

In a typical "hydrocracking" process, for example, various hydrocarbon fuels or the like are produced by flowing a feed stream, which is rich in high-boiling point (e.g. 400° F. and above) hydrocarbons, downwardly through one or more catalyst beds which are vertically-spaced along a reactor column. In this process, it is vital that the vapor phase (e.g. hydrogen) remains in intimate contact (i.e. mixed) with the liquid phase (e.g. hydrocarbons) as the mixed-phase stream flows downward through a catalyst bed in order for the desired exothermic reaction(s) to take place. Unfortunately, there is a natural tendency for the liquid and vapor phases of the feed stream to segregate and seek separate paths through a respective catalyst bed. This is commonly known as "channelling" and is universally recognized as being highly detrimental to the overall efficiency of these types of processes.

Further, since the reactions in these types of processes are highly exothermic, it is also necessary to protect the catalysts in the various beds from the excessive heat normally generated by the reaction(s) taking place in the column. Typically, this is accomplished by injecting a cool, "quench gas" (e.g. hydrogen) into the column at a point intermediate between two adjacent, spaced catalyst beds. The quench gas cools down the mixed-phase stream after the stream has been reacted in a catalyst bed to a temperature below that which would likely cause damage to the catalyst in a lower bed in the column.

Unfortunately, the difference in densities between the quench and process gas phase adversely affect the mixing of the two. This mixing may be further complicated where the construction of a particular column permits only a short space, hence residence time, for the mixing of these two gases along with any liquid phase which may be present before the mixed stream enters the next bed of catalyst in the column.

Still further, in a hydrocracking process or the like, radial thermal gradients (i.e. "hot-spots") often occur in the catalyst beds. Test data have shown that this is caused when the temperature of the gas entering a catalyst bed is not uniform, which, in turn, is the result of poor mixing of the process and quench gases.

Also, it is important to uniformly distribute the mixed-phase stream and the quench gas horizontally or radially across the top of a catalyst bed as the flow enters the bed. By distributing the mixed feed stream/quench gas out radially over the top of the bed, the liquid and gas phases will be maintained in intimate contact with each other and substantially all of the catalyst in the bed will be utilized. Further and maybe even more importantly, the uniform, radial distribution of the stream across the bed reduces the possibility of "hot-spots" from occurring in the catalyst bed.

There have been several different types of devices proposed for addressing many of the above-mentioned problems and to provide good mixing of the vapor/liquid phases of a Feed stream with a quench gas or the like and then distributing the resultant mixed-stream onto a catalyst bed in a reactor column. For example, see U.S. Pat. No. 4,138,327 and those references specifically disclosed and discussed therein. However, while such prior art devices are known, there is still a need for apparatus which can provide improved mixing of the liquid phase of a process stream with gases of differing densities in a relatively small space (e.g. a short length of a process column) and then uniformly distributing the mixed-stream across the column as the mixed-stream continues its downward flow in the column.

DISCLOSURE OF THE INVENTION

The present invention provides a method and apparatus for mixing and distributing two reactants within a column and is especially applicable for systems having relatively low liquid to vapor ratios. The apparatus forms a mixing zone in the column into which a first reactant (e.g. a process stream having both gas and liquid phases) flows vertically downward. The second reactant (e.q. quench gas) is introduced into the mixing zone and flows radially to intercept the downflowing process stream. Due to the construction of the mixing zone, the different gases and the liquid phase are thoroughly mixed by several different mechanisms, i.e. (a) radial jet mixing; (b) perpendicular mixing of the liquid and gas phases; (c) jet/turbulent mixing; (d) high velocity swirl jet mixing and atomizing of the liquid phase; (e) turbulent swirl mixing after the liquid is atomized; (f) additional turbulent jet mixing; and (g) energy dissipation of the flow as the mixed stream is distributed radially outward across the column.

More specifically, the apparatus which forms the mixing zone of the present invention can be used in a variety of different environments to thoroughly mix two or more reactants in a reactor column or the like, e.g. a hydrocracking column having respective mixing zones between fixed-beds of catalysts. In reactor columns of this type, each bed of catalyst normally rests on a grid which allows a first reactant (i.e. a feed or process stream having liquid and gas phases) to pass vertically downward from the lower end of the catalyst bed into the mixing zone while preventing the catalyst from passing therethrough.

The mixing zone of the present invention is comprised of a divider plate which extends radially across the column below the grid which holds an upper catalyst bed. The divider plate has a central opening which, in turn, has a plurality of angled vanes around its circumference. The vanes are spaced to provide passages therebetween which, in turn, form a swirl jet nozzle. A first perforated, cylindrical baffle having radial openings therethrough is positioned around the vanes and, along with the jet nozzle, is closed at its upper end by a cap plate to prevent any vertical flow therefrom.

Mounted around the center opening on the underside of divider plate is a second perforated, cylindrical baffle, which is closed across the bottom thereof. The first and second baffles and their respective closures form a "mixing box" in which much of the mixing takes place. A sieve plate and a riser tray extend radially across the mixing zone below the mixing box to distribute the mixed stream across the column before it enters the next bed of catalyst in the column.

The second reactant stream (e.g. quench gas) is introduced into the mixing zone through a substantially horizontal tube which is positioned above the mixing box. The outlet(s) of the tube is preferably directed upward and is positioned at approximately the center of the mixing zone. A deflector is positioned directly over the outlet(s) to direct the quench gas radially outward in the mixing zone.

In operation, the liquid and/or gas phases of a feed stream flow vertically into the mixing zone from the lower end of an upper catalyst bed in a column. At the same time, the quench gas is injected upwardly into mixing zone through the outlet(s) of the tube and impinges off the deflector to form a radial circular jet which expands across the mixing zone into a "perpendicular mixing zone". During expansion, the quench gas entrains the downcoming gas as the gases flow into the perpendicular mixing area.

The velocity of the gases flowing radially into perpendicular mixing area is about 1.5 times the velocity of the downflowing gas. This velocity ratio provides optimum "perpendicular mixing" for both the process and quench gases and the liquid phase of the process stream. The mixed stream then flows radially inward through the openings in the first baffle. This flow creates "jet/turbulence" mixing of the reactants. The stream next flows through the swirl jet nozzle which imparts a swirling motion to the stream. This action atomizes the liquid phase of the stream into small droplets and effectively creates a high velocity, swirling homogeneous liquid/gas mixture as the stream enters the mixing box.

Further turbulent mixing is accomplished while the stream is in the mixing box as the stream expands and swirls toward the periphery of the box. The mixing box serves three purposes: (1) it forces the swirling jet from the mixing nozzle to change direction and to spread radially while swirling and mixing; (2) it forces the two-phase flow to exit as small-diameter, axial jets; and (3) it rapidly dissipates the energy of the outwardly flowing jets which enables the flow pattern toward sieve plate below the mixing box to be relatively flat and uniform. The flow through the sieve plate, in turn, provides good gas distribution onto riser tray 29.

The stream passes from the sieve plate or tray onto the riser tray with gases passing through the risers near their tops while the liquid phase accumulates on the tray and passes through openings which may be staggered on respective risers at different heights above the tray. This allows a relatively good overall liquid distribution to a lower bed in the column over a range of different heads of liquid on the tray.

The mixed reactants now flow downward through the next fixed bed in the column until they reach the next mixing zone where additional quench gas is introduced and the above-described mixing procedure is repeated. This continues until the process stream reaches the bottom of column where the desired products are removed therefrom.

BRIEF DESCRIPTION OF THE DRAWINGS

The actual construction, operation, and apparent advantages of the present invention will be better understood by referring to the drawings in which like numerals identify like parts and in which:

FIG. 2 is an enlarged view, partly in section, of a typical mixing zone of FIG. 1;

FIG. 3 is a sectional view, slightly enlarged, taken along line 3—3 of FIG. 2; and FIG. 4 is an enlarged perspective view, partly broken away, of a mixing zone of FIG. 1.

BEST KNOWN MODE FOR CARRYING OUT THE INVENTION

Figure 1:
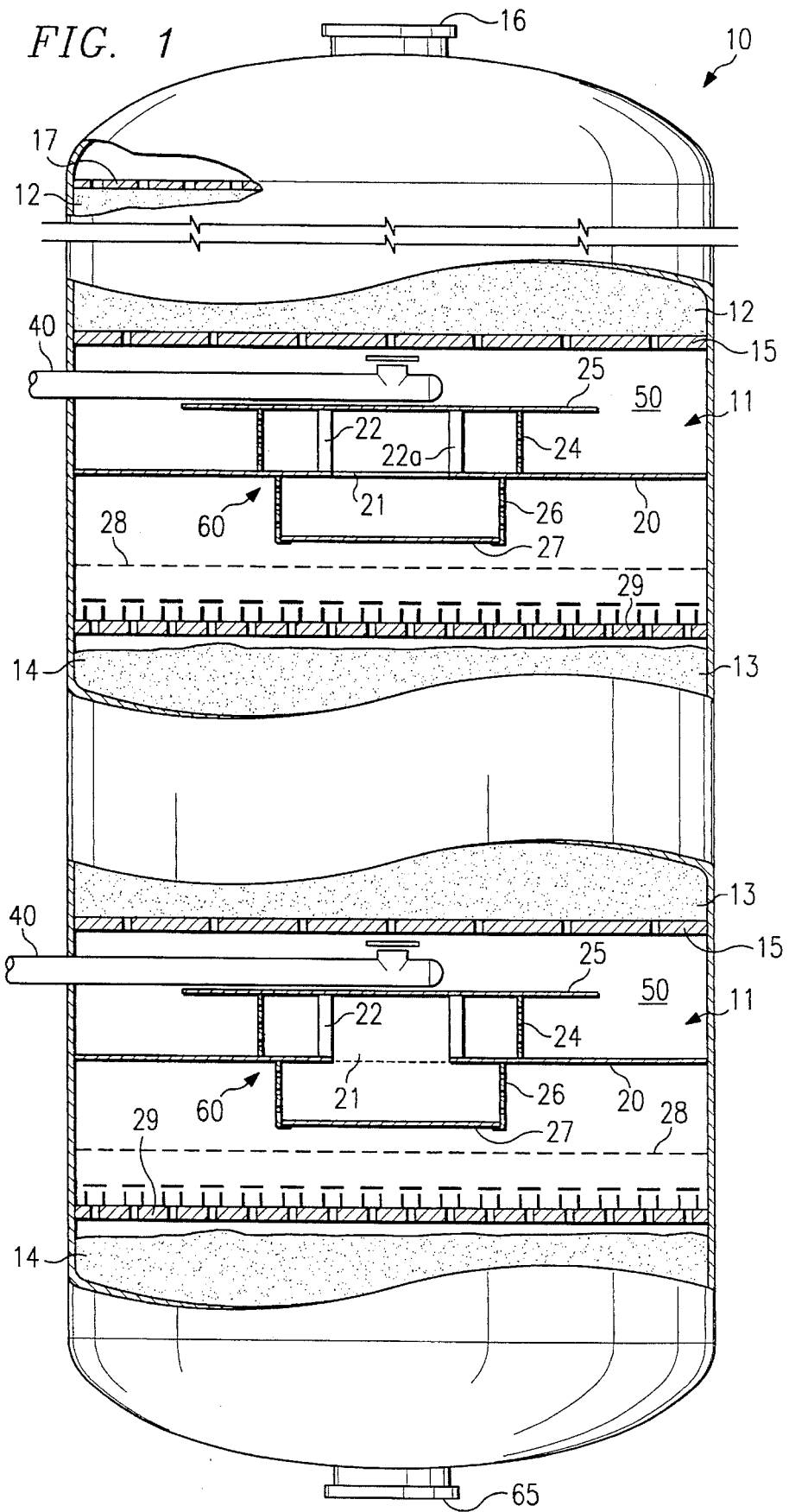
FIG. 1 is an elevational view, partly in section, of a reactor column having a plurality of mixing zones in accordance with the present invention.

Referring more particularly to the drawings, FIG. 1 illustrates a typical reactor column 10 which has one or more mixing zones 11 (two shown in FIG. 1) in accordance with the present invention. It should be understood that the apparatus which forms mixing zone 11 of the present invention can be used to thoroughly mix two reactants in environments other than that shown in FIG. 1 even though the following description will describe the invention as it is used to mix reactants in a fixed-bed catalyst reactor of the type used in hydrocracking and similar operations.

As illustrated, column 10 has a plurality of fixed-beds 12, 13, and 14, of catalyst material or the like which, in turn, are spaced from each other by a respective mixing zone 11. It should further be understood that column 10 could include more or less than three catalyst beds but only three are shown for the sake of clarity. For purposes of description, catalyst beds will be referred to as "upper" or "lower" beds in a relative sense when referring to any two adjacent beds in the column. Further, since all of the mixing zones 11 are substantially the same in construction and operation, only one will need to be discussed and described in detail. In reactor columns of this type, each bed of catalyst normally rests on a bottom grid 15 or perforated plate which allows fluids (i.e. liquid and gas) to pass from the lower end of the catalyst bed into a mixing zone while preventing the catalyst from passing therethrough.

In a typical hydrocracking process, a first reactant stream (e.g. a feed or process stream rich in hydrocarbons having high boiling points, e.g. 400° F. and above), is introduced into or near the top of column 10 through an inlet (e.g. 16). As will be understood, this first reactant stream may be supplied from a pre-treater or the like and usually has a second reactant (e.g. hydrogen gas) mixed therein. A horizontal, perforated plate 17 or other type diffuser or distribution tray is positioned in column 10 at some point below inlet 16 and serves to initially distribute the feed stream radially across upper catalyst bed 12. As the feed stream flows downward through upper bed 12, an exothermic reaction takes place which significantly increases the temperature of the process stream. As the flow reaches the bottom of the catalyst bed, it flows through grid 15 into mixing zone 11.

Now referring to FIGS. 2–4, mixing zone 11 is comprised of a divider plate 20 which extends radially across column 10 and is attached thereto. Divider plate 20 has a central opening 21 therethrough. Positioned around the circumference of opening 21 are a plurality of vanes or louvers 22 (see FIG. 3) which are spaced from each other to provide respective passages 23 therebetween. Vanes 22 are mounted on divider plate 20 at an angle with respect to the diameter of plate 20 (i.e. angle α as measured between tangent line T and the centerline C of each respective vane) to form a swirl jet nozzle 22a for a purpose to be described later. While angle α may vary in some particular applications, it is preferred that angle α be about 45°.

Also mounted on divider plate 20 and spaced outwardly from opening 21 and vanes 22 is a first perforated, cylindrical baffle 24 having radial openings 24a through the wall thereof. Affixed to and extending across the tops of all of the vanes 22 and first baffle 24 is cap plate 25 which prevents any vertical flow through the tops of these elements. Mounted on the underside of divider plate 20 and circumscribing opening 21 is a second perforated, cylindrical baffle 26, which has radial openings 26a through the wall thereof and which is closed at its bottom by bottom plate 27. First and second cylindrical baffles 24, 26 and their respective closures 25, 27, form a "mixing box" 60 as will be further discussed below.

Sieve plate or tray 28 (represented by dotted lines in FIGS. 1 and 2) extends radially across and is attached to column 10 at a point below bottom plate 27 for a purpose to be described below. Mounted below sieve plate 28 is riser tray 29 which extends radially across and is attached to column 10. Riser tray 29 has a plurality of vertically-extending risers (i.e. cylinders 30) which, in turn, form passages in communication with respective vertical openings 31 through tray 29.

Each cylinder 30 is topped with a cap 32 which is positioned to provide an radial opening 33 into the cylinder just below the cap. Also, each riser 30 has one or more radial openings through the wall thereof with these openings 34, 35, 36 being at staggered, vertical distances or heights above tray 29 for a purpose described below. That is, one or more risers may have an opening(s) 34 which lies even with or just above tray 29 while other risers may have its lowest opening(s) 35 further up the wall of the riser while others may have its lowest opening(s) 36 even further up the riser.

Entering from the side of column 10 and positioned to lie above the upper surface of cap plate 25 is a fluid inlet tube 40. Tube 40 has an exit nozzle(s) 41 which is preferably pointed upward and is positioned at approximately the center of column 10. Deflector 42 is positioned directly above outlet(s) 41 for a purpose to be described below.

With the apparatus forming mixing zone 11 having been described, the mixing and distribution operation carried out therein will now be set forth. The feed stream to be processed is flowed downwardly through an upper catalyst bed. In a process of this type, it is vital that the vapor phase (e.g. hydrogen) remains in intimate contact (i.e. mixed) with the liquid phase (e.g. hydrocarbons) as the mixed-phase stream flows through the catalyst in order for the desired exothermic reaction(s) to take place. Unfortunately, there is a natural tendency (normally called "channelling") for the liquid and vapor phases of the feed stream to segregate and seek separate paths through the catalyst bed. Further, since the reactions in these types of processes are highly exothermic, excessive heat is normally generated by the reaction(s) taking place in the column. Mixing zone 11, as will become evident from the following discussion, remixes the phases of the feed stream with a quench gas, which, in turn, cools the resultant feed stream to a temperature below that which would otherwise cause damage to the catalyst in the next lower bed in column 10.

Referring again to FIG. 2, the liquid and/or gas phases of the feed stream flow vertically from the lower end of upper catalyst bed 12, through openings in grid 15, and into mixing zone 11. At the same time, a reactant fluid (e.g. a quench gas such as hydrogen) is injected upwardly into mixing zone through outlet 41 in tube 40. The gas impinges off deflector 42 and is directed radially outward in a horizontal flow path (represented by dashed-arrows) along the underside of grid 15 in FIG. 2. The deflected quench gas forms a radial circular jet and expands across the top of cap plate 25 into a "perpendicular mixing zone" 50 which is formed by the annular section between the wall of column 10 and the end of the cap plate 25.

During the expansion process, the quench gas entrains the surrounding process gas (i.e. gas phase of downcoming stream). However, since the quench gas is lighter than the process gas (the process gas is about 2.5 times denser than the quench gas), the gases are not well mixed by the "radial mixing" mechanism just described.

The velocity of the gases flowing radially into perpendicular mixing zone 50 is about 1.5 times the velocity of the process gas (heavy arrows in FIG. 2) which is flowing vertically downward through grid plate 15. This velocity ratio provides essentially an optimum "perpendicular mixing" mechanism for both the process and quench gases and the liquid phase of the stream. As the initially-mixed stream of quench gas and the phases of the feed stream fill perpendicular mixing zone 50, it must flow in through radial openings 24a in first perforated baffle 24. The flow through the baffle creates turbulence via gas jets and this "jet/turbulence" mechanism further enhances the mixing of the fluids. Baffle 24 is ideally positioned to achieve maximum mixing from both the perpendicular and baffle mixing processes.

The stream next flows through the angled passages 23 of the swirl jet nozzle 22a formed by vanes 22 which, in turn, impart a swirling motion to the stream due to the angle α at which the vanes are positioned. The nozzle atomizes the liquid in the stream into small droplets and effectively creates a high velocity, swirling homogeneous liquid/gas mixture as the stream enters the mixing box 60.

Normally, the gases are not mixed instantaneously as they pass through the swirl jet nozzle 22a. However, further mixing is accomplished while the stream is in the mixing box 60, itself. The homogeneous mixture entering the mixing box gradually expands as it swirls toward the periphery of the box. This swirling motion creates turbulence and thus, continuous mixing of the gas and liquid as it flows to the periphery of the box.

Mixing box 60 serves three purposes. First, it forces the swirling jet from the mixing nozzle 22a to change flow direction and to spread radially while swirling and mixing. The chamber within mixing box 60 provides the volume and thus, the resident time, needed to ensure good mixing of the flows that were combined together as they passed through mixing nozzle 22a. Also, mixing box 60 allows this mixing to occur in a relatively short vertical section of column 10.

Secondly, mixing box 60 forces the two-phase flow to discharge radially as small-diameter jets as the flow exits through radial opening 26a in second, perforated baffle 26. These jets discharge into the flow chamber 61 which lies above sieve plate or tray 28 and entrain the surrounding fluid as the jets flow radially outward towards the reactor wall. This entrainment mechanism creates further mixing of the reactants. Sieve tray 28 is designed to provide a significant pressure drop (e.g. >0.2 psi) across the tray to assure good gas distribution.

And finally, the small diameter radial jets—created as the flow exits mixing box 60 through openings 26*a*— dissipate their energy rapidly as they flow outward towards the column wall. This radial dissipation of energy enables the flow pattern toward sieve plate 28 to be relatively flat and uniform. The flow through the sieve plate, in turn, provides good gas distribution onto riser tray 29. The uniformity of gas distribution is enhanced by limiting the open area (from about 3% to about 20%) in the sieve plate to obtain a pressure drop of >0.2 psi at design operating gas velocities.

The stream passes onto riser tray 29 with gasses passing through openings 33 at the top of each of the risers 30 while the liquid phase accumulates on the tray and passes through staggered openings 34, 35, 36 in the respective risers 30. To achieve a relatively good overall liquid distribution to the lower bed, the liquid head above the bottom row of holes 34 should be at least a half an inch of liquid (preferably one inch of liquid head). Therefore, it is preferred in low liquid-to-gas ratio operations that the holes in the risers be staggered so that only one-third of the risers will pass liquid when the liquid head on tray 29 is low with the number of risers passing liquid increasing as the head of liquid on tray 29 increases.

The mixed process stream and quench gas now flows downward through the "lower" bed of catalyst until it reaches the next mixing zone 11 in column 10 where additional quench gas is introduced and the above-described mixing procedure is repeated. This continues until the process stream reaches the bottom of column 10 where it is removed through outlets 65 (FIG. 1) or the like.

What is claimed is:

1. A mixing zone for a reactor column, said mixing zone comprising:

a divider plate extending radially across a reactor column, said plate having an upper surface and a lower surface and having an opening therethrough;

a first perforated, cylindrical baffle mounted on said upper surface of said divider plate and encircling said opening through said plate;

a nozzle positioned onto said upper surface of said divider plate and positioned between said first perforated baffle and said opening through said plate; said nozzle comprising a plurality of vanes mounted on said upper surface and surrounding said opening in said divider plate and spaced from each other to define passages therebetween;

a cover plate extending radially across the tops of said nozzle and said first perforated baffle to thereby prevent flow out tops of said nozzle and said first perforated baffle;

a second perforated, cylindrical baffle mounted on the lower surface of said divider plate and encircling said opening through said divider plate;

a bottom plate radially extending across the bottom of said second perforated baffle to prevent flow from the bottom of said second baffle, thereby providing a tortuous path for fluids flowing through said mixing zone wherein fluids flowing vertically down said column will be directed radially through the perforations in said first baffle, radially through said nozzle, vertically through said opening in said divider plate, and then radially through the perforations in said second baffle before returning to vertical flow in said column; and an inlet tube positioned within said mixing zone and having an outlet therein above said cover plate for delivering a fluid to said mixing zone.

2. The mixing zone of claim 1 wherein said inlet comprises:

a tube extending horizontally into said column, said tube having an outlet which is positioned at substantially the center of said column; and a deflector spaced from said outlet on which fluid from said outlet will impinge to direct said fluid radially outward toward the periphery of said column.

3. The mixing zone of claim 2 wherein said outlet in said tube is positioned to initially deliver fluid upward towards the top of the column.

4. The mixing zone of claim 1 wherein said vanes are positioned at an angle with respect to the diameter of said divider plate.

5. The mixing zone of claim 4 wherein said angle is equal to about 45°.

6. The mixing zone of claim 1 including:

riser tray extending radially across said column and positioned below said second perforated baffle.

7. The mixing zone of claim 6 wherein said riser tray comprising:

a plate extending radially across said column, said plate having a plurality of spaced openings therethrough;

a riser cylinder surrounding and extending upward from each respective said spaced opening; and each said riser cylinder having at least one opening through the wall thereof at a prescribed distance above said plate.

8. The mixing zone of claim 7 wherein said prescribed distances for certain of said riser cylinders vary from said distance for other of said riser cylinders.

9. The mixing zone of claim 8 further comprising:

a sieve plate extending radially across said column and positioned between said second perforated baffle and said riser tray.

10. A method of mixing reactants in a reactor column, said method comprising:

flowing a first reactant vertically downward into a mixing zone within a reactor column;

flowing a second reactant radially outward into said mixing zone to perpendicularly intercept the down flowing first reactant;

flowing said first and second reactants radially inward through a first set of openings to further mix said reactants due to the resulting turbulence;

flowing said mixed reactants inwardly through a nozzle which comprises vanes mounted on a divider plate within said mixing zone and which imparts a swirling action thereto; and flowing said further mixed reactants through said divider plate and radially outward through a second set of openings to complete the mixing of the reactants.

11. The method of claim 10 wherein said second reactant is first flowed upward in said mixing zone before being deflected radially outward therein.

12. The method of claim 10 wherein said first reactant is comprised of a gas phase and a liquid phase and wherein said flow through said nozzle atomizes said liquid phase.

13. The method of claim 12 including:

flowing the mixed reactants through a sieve plate to distribute said mixed reactants radially across said column below said mixing zone.

14. The method of claim 13 including:

flowing said mixed reactants from said sieve plate through a riser tray to further radially distribute said mixed reactants across said column.

* * * * *